BINARY COMPARATOR

Filed Jan. 22, 1963 2 Sheets-Sheet 1

LEGEND

INVENTOR.
HILLEL WEINSTEIN
BY
Attorney

INVENTOR.
HILLEL WEINSTEIN
BY Samuel Cohen
Attorney 3,251,035
Patented May 10, 1966

3,251,035
BINARY COMPARATOR

Hillel Weinstein, New Brunswick, N.J., assignor to Radio Corporation of America, a corporation of Delaware Filed Jan. 22, 1963, Ser. No. 253,162
4 Claims. (Cl. 340—146.2)

This invention relates to an improved circuit for comparing two binary words, that is, for determining whether one binary word is greater than, less than, or equal to a second binary word. Circuits of this type are useful, among other places, in data processing equipment.

The circuit of the invention includes means responsive to each pair of like significance bits of the two binary words being compared for producing a third word. In the third word a bit has one value when the corresponding two bits compared are equal, and a second value when the corresponding two bits compared are unequal. The circuit also includes means responsive to the bit of highest significance having this second value in the third word, if such a bit is present, and the two bits of the same significance in the two words being compared for manifesting which one of the two words compared is the larger. If a bit of this second value is not present in the third word, the circuit indicates that the two words being compared are equal.

The invention is discussed in greater detail below and is described in the following drawings of which:

In the embodiment of the invention discussed below, a three bit binary word $a_1$, $a_2$, $a_3$ is compared with a second three bit binary word $b_1$, $b_2$, $b_3$. It should be appreciated, however, that this is merely illustrative as the invention is applicable to the comparison of words having any desired number of binary bits.

In the circuit of the invention, electrical signals represent binary bits. It is arbitrarily assumed that a positive-going signal represents a "zero" and a negative going signal a "one." For the sake of brevity, the bit itself rather than the signal manifesting the bit is generally referred to in the discussion.

Figure 1:
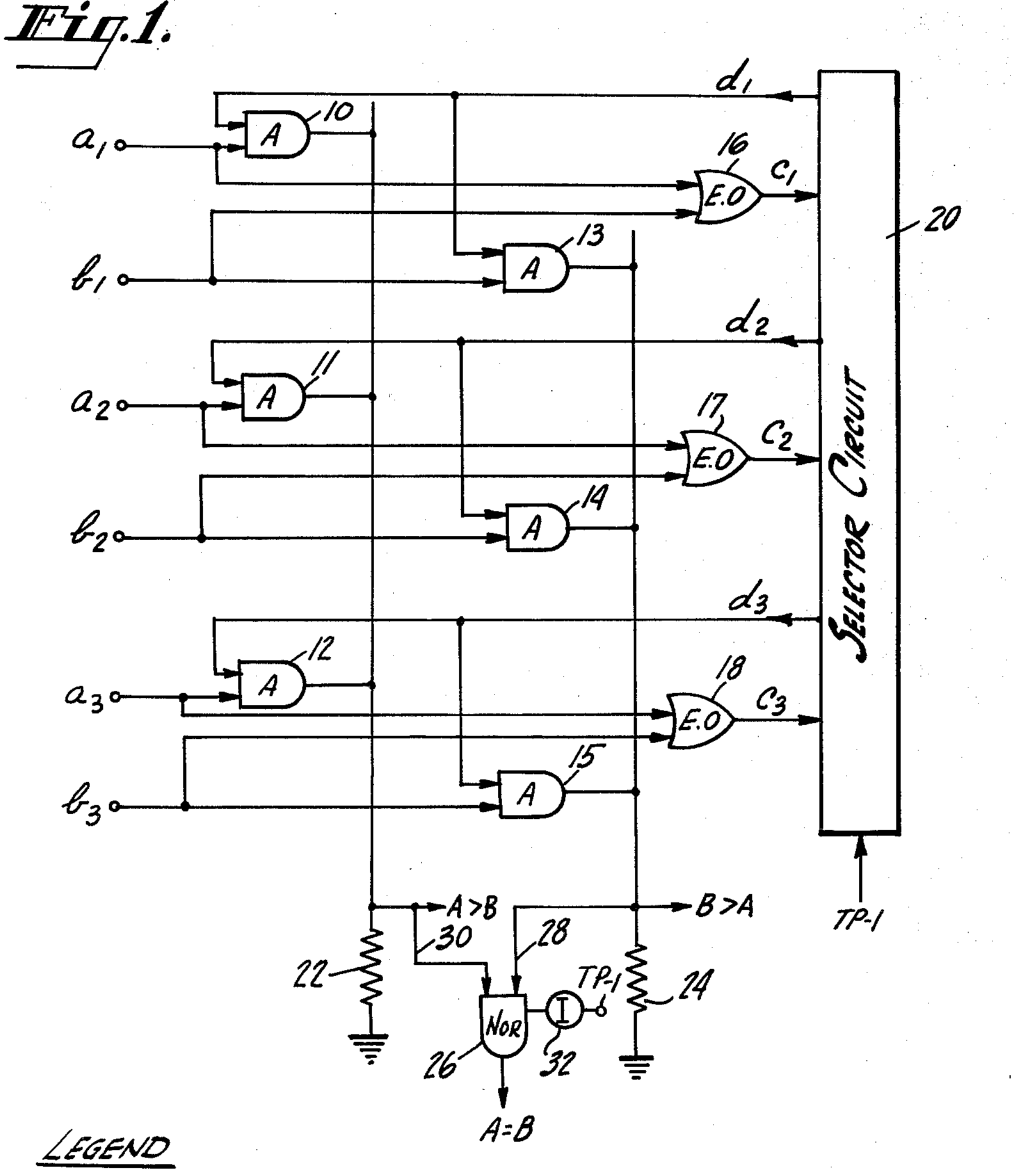
FIG. 1 is a block circuit diagram of the comparator of the invention.
Figure 1:
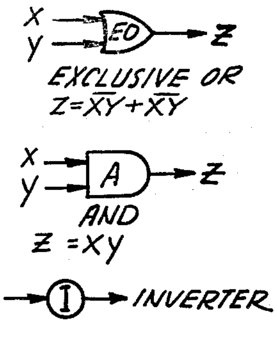

The circuit of FIG. 1 includes six AND gates 10–15 three EXCLUSIVE-OR gates 16–18 and a selector circuit 20. Each AND gate receives either an $a$ bit or a $b$ bit. For example, AND gate 10 receives the bit $a_1$ and AND gate 13 receives the bit $b_1$. Each AND gate also receives a $d$ bit which is fed back from the selector circuit 20. For example, AND gates 10 and 13 receive the bit $d_1$. Each EXCLUSIVE-OR gate receives the two bits of the same rank of the two binary words being compared. For example, EXCLUSIVE-OR gate 16 receives the bits $a_1$ and $b_1$. The bits $a_1$, $b_1$ are the bits of greatest significance (the $2^2$ bits) and the bits $a_3$, $b_3$ are the bits of least significance (the $2^0$ bits). The output of the circuit of FIG. 1 is taken from across resistors 22 or 24, or from NOR gate 26.

The operation of the circuit of FIG. 1 may be best understood by specific example. Assume first that the $a$ word is 111 and the $b$ word is 011. Clearly, the $a$ word is larger than the $b$ word so that the answer $A>B$ should be produced. As $a_1=1$ and $b_1=0$, EXCLUSIVE-OR gate 16 produces a "one" output. The selector circuit 20 in response to a timing pulse TP–1 and a binary word $c_1$, $c_2$, $c_3$, having a "one" in the $c_1$ position, produces the binary output word $d_1$, $d_2$, $d_3=100$ regardless of the values of $c_2$ and $c_3$. (Details of this circuit are given shortly.) The $d_1=1$ bit is fed back to the AND gate 10. This input primes the gate, that is, it places the gate in condition to be enabled. As $a_1$, the second input to AND gate 10, is also a "one," AND gate 10 becomes enabled, produces a "one" output and a "one" appears across resistor 22. $b_1$ is a "zero," so that AND gate 13 produces a "zero" output. $d_2$ and $d_3$ are also "zero" so that AND gates 14 and 15 both produce a "zero" output. Therefore, a "zero" output appears across resistor 24 and the $a$ word has been determined as the larger one of the two.

As the next example, assume that the $a$ word is 101 and the $b$ word is 110. The two inputs to EXCLUSIVE-OR gate 16 are both "one" ($a_1=1$ and $b_1=1$) so that $c_1=0$. Under these conditions, the $d_1$ bit produced by the selector circuit 20 when TP–1 is applied is also "zero" so that AND gates 10 and 13 are inhibited.

$a_2$ is "zero" and $b_2$ is "one." This causes EXCLUSIVE-OR gate 17 to produce a $c_2=1$ output. The selector circuit therefore produces an output $d_2=1$, $d_3=0$ when TP–1 is applied. The $d_2=1$ output plus the $b_2=1$ output enables AND gate 14 and a signal $B>A$ appears across resistor 24. It has already been mentioned that AND gate 10 is disabled. The $a_2=0$ input disables AND gate 11. The $d_3=0$ output disables AND gates 12 and 15. As AND gates 10, 11 and 12 are disabled, that is, these three AND gates produce a "zero" output, a "zero" appears across output resistor 22.

In the next example, assume that the $a$ word equals the $b$ word. Under these conditions, it is apparent that a "zero" appears at leads 28 and 30. When the TP–1 pulse occurs, it causes the logical inverter 32 to apply a "zero" to the NOR gate 26. As the three inputs to the NOR gate are now "zero," an output $A=B$ is produced.

Figures 2, 3:
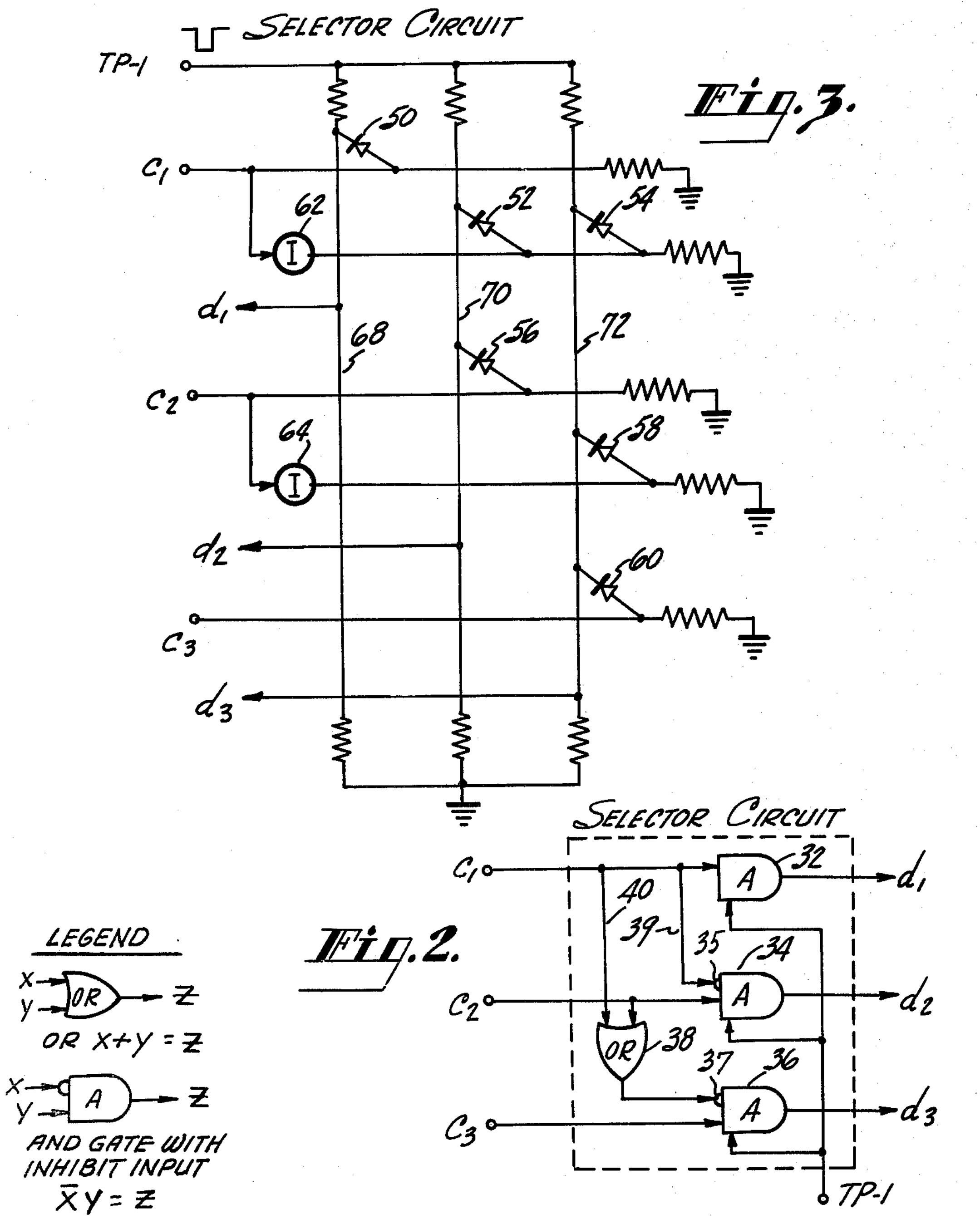
FIG. 2 is a block circuit diagram of the selector circuit which appears in FIG. 1.
FIG. 3 is a schematic circuit diagram of one form of selector circuit which may be used in the circuit of the invention.

A block circuit diagram of the selector circuit is shown in FIG. 2. It includes three AND gates 32, 34 and 36 and an OR gate 38. The purpose of this circuit is to select the bit of highest significance at the input which has the value "one." For example, if the $c_1$ bit is a "one" the circuit produces a $d_1=1$ output and a $d_2=d_3=0$ output. If the input word is $01c_3$, then the $d$ output produced should be 010 (regardless whether $c_3$ is 1 or 0). If the input is 001, then the output should be 001 also. Assume first that the input is $1c_2c_3$ (in this example, $c_2$ and $c_3$ can each have any value). When $c_1$ is a "one," AND gate 32 is primed. However, the "one" is applied via lead 39 to the inhibit terminal 35 of AND gate 34 and via lead 40 and OR gate 38 to the inhibit terminal 37 of AND gate 36. Thus, AND gates 34 and 36 are disabled due to the presence of the inhibit signals. Therefore, when the TP–1 pulse occurs, only AND gate 32 becomes enabled and the output word produced is 100.

If the input word to the selector circuit is $01c_3$, AND gate 32 is disabled and OR gate 38 disables AND gate 36. Therefore, when a TP–1 pulse occurs, the only gate which becomes enabled is 34 and the output word produced is 010.

FIG. 3 is a circuit diagram of one way in which the circuit of FIG. 2 may be implemented. The circuit consists of a matrix which includes diodes 50, 52, 54, 56, 58 and 60, and a number of resistors. The circuit also includes inverters 62 and 64. Assume again that the input word is $1c_2c_3$. A "one" appears as a negative-going voltage. The "one" on lead $c_1$ back biases diode 50. The logical inverter 62 changes the "one" to a "zero" and this "zero" (which is a positive-going voltage) forward biases diodes 52 and 54. Therefore, when the timing pulse TP–1 (a negative-going pulse) occurs, diode 50 does not conduct but diodes 52 and 54 do conduct. Under these conditions, column 68 carries a negative voltage (binary "one") and columns 70 and 72 carry a positive voltage (binary "zero"). The output *d* word produced is 100, as required.

As one other example, assume that the *a* input word equals the *b* input word. In this case, the *c* word is 000. In terms of voltage, the *c* lines all carry a positive-going voltage so that the diodes 50, 56 and 60 are all forward biased. Therefore, when the TP–1 pulse occurs, columns 68, 70 and 72 all carry a positive voltage (binary "zero") and the *d* word produced is 000. The *d* word is fed back to the circuit shown in FIG. 1 and the NOR gate 26 produces an output $a=b$.

An important advantage of the comparator circuit of FIG. 1 is that it is very fast. It is not necessary that a carry signal "ripple" from stage to stage as in many previous circuits. Instead, as soon as the timing pulse TP–1 occurs, an output is available indicative of whether the two words being compared are equal or unequal and, if unequal, the sense of the unequality. This is so regardless of the length of the two binary words.

Although only one specific type of selector circuit is illustrated, there are a number of others which are available which can be used instead. As one example, the convergent-divergent tree network of application Serial No. 213,339, filed July 30, 1962 by the present inventor may be employed. In this network, the time required to perform the comparison of two words is one cycle of CP pulses, that is, CP–1, CP–2, CP–3.

What is claimed is:

1. A circuit for comparing two *n* bit binary words comprising, means responsive to the two words for producing a third *n* bit word, any bit of which has one value when the corresponding two bits compared are equal and a second value when the corresponding two bits compared are unequal; and means responsive to the bit of highest significance having said second value in the third word, and the two bits of the same significance in the two words being compared, for manifesting which of the two words is the larger.

2. A circuit for comparing two binary words comprising, means responsive to the two words for producing a third word, the bits of which have one value when the two bits compared are equal and a second value when the two bits compared are unequal; means responsive to the bit of highest significance having said second value in the third word, and the two bits of the same significance in the two words being compared, for manifesting which of the two words is the larger; and means responsive to the absence from the third word of a bit of said second value for indicating that the first and second words are equal.

3. A circuit for comparing two binary words comprising, in combination,

*n* first lines for respectively supplying manifestations of a first *n* bit binary word;

*n* second lines for respectively supplying manifestations of a second *n* bit binary word;

*n* EXCLUSIVE-OR gates, each connected to receive a different first and second line, and the first and second line for each gate carrying bits of the same significance;

2*n* logical product gates, each connected to a different one of said lines; and means responsive to the output word of the *n* EXCLUSIVE-OR gates for priming the two logical product gates which receive bits of the same significance as the EXCLUSIVE-OR gate of highest significance which is enabled, and for disabling all other logical product gates.

4. A circuit for comparing two binary words comprising, in combination,

*n* first lines for respectively supplying manifestations of a first *n* bit binary word;

*n* second lines for respectively supplying manifestations of a second *n* bit binary word;

*n* EXCLUSIVE-OR gates, each connected to receive a different first and second line, and the first and second line for each gate carrying bits of the same significance;

2*n* AND gates, each connected to a different one of said lines;

selector circuit means responsive to the output word of the *n* EXCLUSIVE-OR gates for producing a second output word having a "one" in the same bit position as the "one" of highest significance in the output word of the EXCLUSIVE-OR gates and a "zero" in all other bit positions; and means for applying the bits of the second word to the 2*n* AND gates, each bit being applied to the two AND gates which receive the bits of the same significance of the first and second words, respectively.

References Cited by the Examiner

UNITED STATES PATENTS

| | | | |
|---|---|---|---|
| 2,923,475 | 2/1960 | Ketchledge | 340—146.2 |
| 2,923,476 | 2/1960 | Ketchledge | 340—146.2 |
| 3,000,001 | 9/1961 | Brink | 340—146.2 |
| 3,011,150 | 11/1961 | Ketchledge | 340—146.2 |
| 3,011,151 | 11/1961 | Ketchledge | 340—146.2 |
| 3,102,994 | 9/1963 | Stampler | 340—146.2 |

R. C. BAILEY, *Primary Examiner.*

I. FAIBISCH, *Assistant Examiner.*